US006526886B2

(12) United States Patent
Loccufier et al.

(10) Patent No.: US 6,526,886 B2
(45) Date of Patent: Mar. 4, 2003

(54) COMPUTER-TO-PLATE BY INK JET

(75) Inventors: Johan Loccufier, Zwijnaarde (BE);
Marc Van Damme, Mechelen (BE);
Luc Vanmaele, Lochristi (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/864,702

(22) Filed: May 23, 2001

(65) Prior Publication Data

US 2002/0014175 A1 Feb. 7, 2002

Related U.S. Application Data
(60) Provisional application No. 60/211,931, filed on Jun. 16, 2000.

(30) Foreign Application Priority Data

May 26, 2000 (EP) .............................................. 00201861

(51) Int. Cl.⁷ ................................................. B41C 1/10
(52) U.S. Cl. ........................ 101/466; 101/457; 101/462
(58) Field of Search ................................. 101/457, 462, 101/463.1, 465, 466, 467; 347/95, 96, 100, 105, 106

(56) References Cited

U.S. PATENT DOCUMENTS

| | | | | |
|---|---|---|---|---|
| 3,574,297 A | | 4/1971 | Bozer ........................ 101/451 |
| 5,695,908 A | * | 12/1997 | Furukawa ................... 101/466 |
| 5,738,013 A | * | 4/1998 | Kellett ..................... 101/463.1 |
| 6,204,307 B1 | * | 3/2001 | Miyabayashi ............... 523/160 |

FOREIGN PATENT DOCUMENTS

| | | | |
|---|---|---|---|
| EP | 0 927 751 | | 7/1999 |
| GB | 1309304 | * | 3/1973 |
| WO | WO 97/43122 | | 11/1997 |

OTHER PUBLICATIONS

Research Disclosure No. 289118 "Ink Jet Recording for Use in Making Lithographic Printing Plates", De brabandere et al., pp. 351–352, May, 1988.*

* cited by examiner

*Primary Examiner*—Stephen R. Funk
(74) *Attorney, Agent, or Firm*—Joseph T. Guy; Nexsen Pruet Jacobs & Pollard, LLC

(57) ABSTRACT

A method for preparing a lithographic printing plate by means of ink jet is disclosed. In the ink jet fluid an oleophilizing compound is incorporated containing a 1,3-dicarbonyl group in its chemical formula.

9 Claims, No Drawings

COMPUTER-TO-PLATE BY INK JET

This application claims the benefit of US Provisional Application No. 60/211,931 filed Jun. 16, 2000.

FIELD OF THE INVENTION

The present invention relates to a method for the preparation of a lithographic printing plate by means of ink jet printing.

BACKGROUND OF THE INVENTION

Traditional techniques of printing include letterpress printing, gravure printing and offset lithography. All of these printing methods require a plate, usually loaded onto a plate cylinder of a rotary press for efficiency, to transfer ink in the pattern of the image. In letterpress printing, the image pattern is represented on the plate in the form of raised areas that accept ink and transfer it onto the recording medium by impression. Gravure printing cylinders, in contrast, contain series of wells or indentations that accept ink for deposit onto the recording medium.

In the case of traditional offset lithography the image to be printed is present on a plate as a pattern of ink accepting (oleophilic) areas on an ink repellent (oleophobic or hydrophilic) background. In the wet system the required ink repellency is provided by an initial application of a dampening (or "fountain") solution prior to inking. Conventional presensitized lithographic printing plates bear a UV sensitive coating based on photopolymer or diazonium chemistry. The plates have to be UV-exposed through a mask carrying the image. The mask is a graphic arts film prepared by photographic techniques based on silver halide chemistry and involving exposure by a camera or by an image-setter, and further involving wet processing. Depending on the type of plate used (negative or positive) the non-image areas or the image areas are solubilized thereby differentiating the plate into oleophilic and hydrophilic areas. A disadvantage of this traditional method is the necessary cumbersome preparation of the photographic intermediate film involving wet processing. A further drawback is the wet processing of the printing plate itself.

With the advent of the computer in revolutionizing the graphics design process leading to printing, there have been extensive efforts to develop a convenient and inexpensive computer-to-plate system wherein a photographic intermediate is no longer required. In recent years some of these systems are introduced into the market based on different chemical systems and exposure methods. For instance, the SETPRTINT material, trade mark of Agfa-Gevaert N.V. is based on silver halide DTR chemistry and consists of a polyethylene terephthalate base carrying a photographic coating which after photo-mode exposure and processing produces complementary oleophilic and hydrophilic areas. Another system based on photo-mode exposure but with a hydrophilic aluminum base is LITHOSTAR, trade mark of Agfa-Gevaert N.V. A system based on heat mode exposure by means of an intense infra-red laser is called THERMOSTAR, also a trade mark of Agfa-Gevaert N.V.

Many of the new computer-to-plate system are large, complex, and expensive. They are designed for use by large printing companies as a means to streamline the prepress process of their printing operations and to take advantage of the rapid exchange and response to the digital information of graphics designs provided by their customers. There remains a strong need for an economical and efficient computer-to-plate system for the many smaller printers who utilize lithographic printing.

A number of electronic, non-impact printing systems have been investigated for use in making lithographic printing plates to satisfy the needs of these smaller printers. Foremost among these have been laser printing systems, for example as described in U.S. Pat. No. 5,304,443 and references therein. Another non-impact printing system which has received attention for economical and convenient computer-to-plate preparation for lithographic printing is thermal transfer printing, for example, as described in U.S. Pat. No. 4,958,564.

In recent years, ink jet printers have replaced laser printers as the most popular hard copy output printers for computers. Some of the competitive advantages of ink jet printers are low cost and reliability. The ink jet printing system is a relatively rapid image output system and has a simple construction because it does not require any complex optical system. In recent times, there have been some reports in the literature proposing the use of ink jet printers to make lithographic printing plates.

In Japanese Kokai 62-25081, an oleophilic liquid or fluid ink was printed by ink jet printing onto a hydrophilic aluminum surface of a lithographic printing plate. Titanate or silane coupling agents were present in the ink.

An ink jet printing apparatus to make lithographic printing plates is described in PCT WO 94/11191. It is directed to depositing hydrophobic or hydrophilic substances on hydrophobic printing plates.

In U.S. Pat. No. 5,501,150, a fluid ink and hydrophilic media set containing materials to produce a silver-reducible image by ink jet printing are used to make a metallic silver image which, following wet processing to make the silver image sufficiently hydrophobic, is said to provide a lithographic printing plate.

Ink jet printing wherein the ink is a solid or phase change type ink instead of a liquid or fluid type ink is described in U.S. Pat. No. 4,833,486 to deposit a hot wax on a surface of an offset plate. Upon cooling of the wax, it solidifies, thereby providing a printing plate. Solid ink jet printing has serious disadvantages for lithographic plates in that the wax or resin image has limited durability due to its thermoplastic, chemical, and adhesive properties and the amount and rounded shape of the solidified ink jet droplet on the media do not have the intrinsic image resolution properties found in liquid ink jet printing.

There is also prior art in the use of ink jet printing to apply an opaque image or mask pattern to a photosensitive lithographic printing plate blank, as for example, in Japanese Kokai 63-109,052. The blank is then exposed through the ink jet imaged mask pattern and then processed by conventional means to provide a lithographic printing plate. This approach retains the materials and processing of conventional lithographic printing plates and only uses ink jet printing as an alternative for the photomask through which the conventional plates are exposed. Thus this approach adds to the complexity and expense of the platemaking process and does not depend on the ink jet ink image for the hydrophobic image of the plate. U.S. Pat. No. 5,495,803 describes a solid or phase change type of ink jet printing to form a photomask for a printing plate.

As a further example of the methods for preparing printing plates by using the ink jet printing system, Japanese Kokai Publication 113456/1981 proposes methods for preparing printing plates whereby ink-repelling materials (e.g. curable silicones) are printed on a printing plate by ink jet printing. The printing plate obtained by this method is an intaglio printing plate in which the ink-repelling material formed on the surface of the substrate serves as a non-image part. As a result, the resolution of the printed images at shadow area or reversed lines is not so good. Moreover, a large amount of ink is needed in this method because the ink-repelling material must be deposited on the whole non-image part which occupies most of the surface of the printing plate, thereby delaying the printing process.

U.S. Pat. No. 5,511,477 discloses a method for the production of photopolymeric relief-type printing plates comprising: forming a positive or a negative image on a substrate by ink jet printing with a photopolymeric ink composition, optionally preheated to a temperature of about 30°–260° C., and subjecting the resulting printed substrate to UV radiation, thereby curing said ink composition forming said image. This is an obnoxious method due to the sometimes high vapour pressure and toxicity of said inks.

U.S. Pat. No. 5,312,654 discloses a method for making lithographic printing plates comprising: forming an image on a substrate having an ink absorbing layer and a hydrophilized layer between the substrate and the absorbing layer by ink jet printing using a photopolymerizable ink composition, and exposing it to an actinic light in the wavelength region with which said ink composition is sensitized to cure the image. The printing endurance of said printing plates is low.

Japanese Kokai Publication 69244/1992 discloses a method for making printing plates comprising the steps of forming a printed image on a recording material subjected to a hydrophilic treatment by ink jet printing using a hydrophobic ink containing photocurable components, and exposing the whole surface to actinic light. However, the surface of the substrate to be used for the lithographic plate is usually subjected to various treatments such as a mechanical graining, an anodizing or a hydrophilic treatment to obtain good hydrophilic property and water retention property. Therefore, even the use of an ink composition having a very high surface tension results in a poor image on the surface of the substrate because of ink spreading and low printing endurance.

EP-A-533 168 discloses a method for avoiding said ink spreading by coating the lithographic base with an ink absorbing layer which is removed after ink printing. This is an uneconomical and cumbersome method.

Research Disclosure 289118 of May 1988 discloses a method for making printing plates with the use of an ink jet wherein the ink is a hydrophobic polymer latex. However said printing plates have a bad ink acceptance and a low printing endurance.

EP-A-003 789 discloses a process for the preparation of offset printing plates by means of an ink jet method with oleophilic inks. There is not indicated how said inks are made but from the examples it is clear that it concerns artificial latices, which are difficult to prepare.

JP-A-57/038142 discloses a method of preparing a printing plate by forming an ink image on a blank printing plate, and also by fixing this image thermally by making toner to adhere to this image-formed area. The composition of the ink is not mentioned, only the composition of the toners is disclosed.

JP-A-07/108667 discloses a plate-making method forming an ink image containing a hydrophilic substance on a conductive support whose surface layer is made hydrophilic according to an electrostatic attraction type ink set system to dry or cure the same, by applying bias voltage to the conductive support at the time of ink jet writing. This is a cumbersome process.

U.S. Pat. No. 5,213,041 discloses a method for preparing a reusable printing plate for printing, projecting an imaging deposit on the plate surface by jet printing using an ejectable substance containing a heat fusible component. The image forms an imaging deposit which is fused to the surface of the printing plate using a variable frequency and variable power induction heater.

In WO 97/43122 a lithographic printing plate is manufactured by means of an ink jet fluid comprising reactive components selected from the group consisting of transition metal complexes and organic carbonyl compounds. In a preferred embodiment the reactive compound comprises one or more chromium complexes of an organic acid.

The present invention extends the teaching on the preparation of a lithographic printing plate whereby an oleophilizing fluid is directly applied onto a lithographic receiver by means of ink jet printing.

OBJECTS OF THE INVENTION

It is an object of the present invention to provide a simple and inexpensive method for the manufacturing of a lithographic printing plate.

It is a further object of the present invention to provide a method for the preparation of a lithographic printing plate that requires no intermediate graphic film.

It is a further object of the present invention to provide a method for the preparation of a lithographic printing plate that requires no processing.

It is still a further object of the present invention to provide a method for the preparation of a lithographic printing plate that produces little or no waste and is therefore advantageous from the viewpoint of ecology.

It is still a further object of the present invention to provide a method for the preparation of a lithographic printing plate whereby the manufacturing steps can be performed in daylight.

Further objects will become clear from the description hereinafter.

SUMMARY OF THE INVENTION

The above mentioned objects are realized by providing a method for the preparation of a lithographic printing plate, said method comprising dispensing information-wise by means of ink jet printing droplets of a fluid onto a surface of a lithographic receiver, characterized in that said fluid contains an oleophilizing compound having in its chemical formula a 1,3-dicarbonyl group capable of reacting with said surface of said lithographic receiver.

DETAILED DESCRIPTION OF THE INVENTION

The different components used in accordance with the method of the present invention will now be explained in detail.

I. The Ink Jet Fluid

The essence of the present invention is the presence in the ink jet fluid of an oleophilizing compound having in its chemical formula a 1,3-dicarbonyl group.

Preferred oleophilizing compounds are selected from the group consisting of β-diketones, β-dialdehydes, 1,3-aldehydo-ketones, β-keto-esters, β-keto-thioesters, β-aldehydo-esters, β-aldehydo-thioesters, β-keto-amides, β-aldehydo-amides, 1,3-diesters, 1,3-dithioesters, and 1,3-diamides.

Typical examples of 1,3-dicarbonylcompounds are given in table I:

| Structure | Compound |
|---|---|
| (phenyl-CO-CH2-CO-CH3) | I-1 |
| (H3C-CO-CH(C5H11)-CO-CH3) | I-2 |
| (2-C16H33O-C6H4-CO-C(COCH3)(COOEt)) | I-3 |
| (4-C12H25O-C6H4-CO-CH2-COOMe) | I-4 |
| (Ph-CO-CH(SC8H17)-CO-Ph) | I-5 |
| (H3C-CO-CH(COOEt)-N+(pyridinium-4-CH(C4H9)2) Cl−) | I-6 |
| (4-C12H25O-C6H4-CO-CH2-CHO) | I-7 |
| (4-C12H25O-C6H4-CO-CH(imidazol-1-yl)-CO-CH3) | I-8 |

| Structure | Compound |
|---|---|
| [structure with C7H15-phenyl-SO2, diethyl malonate] | I-9 |
| [structure: benzoyl, C(=O)NHPh, C(=O)C11H23] | I-10 |
| [triphenylphosphonium with bis-acetyl methine, Cl⁻] | I-11 |
| [bis(4-carboxyphenyl) with central S-C14H29] | I-12 |
| [C8H17O-phenyl-C(O)-CH2-C(O)NH-phenyl-SO3⁻ Na⁺] | I-13 |
| [benzoyl, phenyl ester, thiadiazole-S-C6H13] | I-14 |

The compounds described above are commercially available or can be synthetized according to well-known simple methods.

The oleophilizing agent may be present in the ink in an amount from 0.01 to 6, preferably from 0.02 to 3% by weight.

It is necessary that the oleophilizing agent is in the form of a homogeneous solution or a stable colloidal dispersion, so that it can pass through the nozzles of the printer head.

The liquid carrier is water or an organic solvent or combinations thereof. Choice of the specific liquid carrier depends on the specific ink jet printer and its compatibility with the ink jet printing head and cartridge being used for the ink jet printing. Both aqueous based and solvent based fluids can be used in the present invention depending on the ink jet technology that is being used: piezo, thermal, bubble jet or continuous ink jet.

While water is the preferred medium for aqueous inks, the aqueous composition may comprise one or more water miscible solvents e.g. a polyhydric alcohol such as ethylene glycol, diethylene glycol, triethylene glycol or trimethylol propane. The amount of aqueous carrier medium in the aqueous composition may be in the range from 30 to 99.995, preferably from 50 to 95% by weight.

Also organic solvents may be used as a carrier medium for the ink jet fluid, e.g. alcohols, ketones or acetates.

As known for the ink jet technology, the jet velocity, separation length of the droplets, drop size and stream stability is greatly affected by the surface tension and the viscosity of the aqueous composition. Ink jet fluids suitable for use with ink jet printing systems may have a surface tension in the range from 20 to 60, preferably from 30 to 50 dyne/cm. Control of surface tensions in aqueous ink jet fluids may be accomplished by additions of small amounts of surfactants. The level of surfactants to be used can be determined through simple trial and error experiments. Several anionic and nonionic surfactants are known in the ink jet art. Commercial surfactants include the SURFYNOL™ series, trade mark from Air Products; the ZONYL™ series, trade mark from DuPont; the FLUORAD™ series, trade mark from 3M, and the AEROSOL™ series, trade mark from Cyanamid. The viscosity of the fluid is preferably not greater than 20 mPa.s, e.g. from 1 to 10, preferably from 1 to 5 mPa.s at room temperature.

The ink jet fluid may further comprise other ingredients. A co-solvent may be included to help prevent the ink from drying out in the orifices of the print head. A biocide may be added to prevent unwanted microbial growth which may occur in the ink over time. Additional additives that may be optionally present in the ink include thickeners, pH adjusters, buffers, conductivity enhancing agents, drying agents and defoamers.

In order to enhance the image contrast after jetting the image on a lithographic receiver dyes may be added. Many dyes and pigments are known to be suited for the ink jet technology. Suitable dyes are further selected based on their compatibility in the carrier medium (i.e. aqueous based or solvent based) and on the compatibility with the oleophilizing agent, i.e. they should not lead to coagulation. Especially favoured for aqueous inks are anionic dyes such as acid black II. The Lithographic Receiver The support may be any support suitable for printing plates. Typical supports include metallic and polymeric sheets or foils. Preferably, a support having a metallic surface is used. Preferably, the metallic surface is oxidised. In a particularly preferred embodiment of the invention, a support having an anodised aluminium surface is employed. The support for the lithographic printing plate is typically formed of aluminium which has been grained, for example by electrochemical graining, and then anodised, for example, by means of anodising techniques employing sulphuric acid and/or phosphoric acid. Methods of both graining and anodising are very well known in the art and need not be further described herein. After writing the image the printing plate can be inked with printing ink in the normal way, and the plate can be used on a printing press. Before inking the plate can be treated with an aqueous solution of natural gum, such as gum acacia, or of a synthetic gum such as carboxymethyl cellulose, as it is well known in the art of printing.

According to another mode in connection with the present invention the lithographic base with a hydrophilic surface comprises a flexible support, such as e.g. paper or plastic film, provided with a cross-linked hydrophilic layer. A particularly suitable cross-linked hydrophilic layer may be obtained from a hydrophilic binder cross-linked with a cross-linking agent such as formaldehyde, glyoxal, polyisocyanate, melamine type cross-linkers, ammonium zirconyl carbonate, titanate crosslinkers, or a hydrolysed tetraalkylorthosilicate. The latter is particularly preferred.

As hydrophilic binder there may be used hydrophilic (co)polymers such as, for example, homopolymers and copolymers of vinyl alcohol, acrylamide, methylol acrylamide, methylol methacrylamide, acrylate acid, methacrylate acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60 percent by weight, preferably 80 percent by weight.

A cross-linked hydrophilic binder in the heat-sensitive layer used in accordance with the present embodiment also contains colloidal inorganic pigments that increase the mechanical strength and the porosity of the layer e.g. metal oxide particles which are particles of titanium dioxide or other metal oxides. It is believed that incorporation of these particles gives the surface of the cross-linked hydrophilic layer a uniform rough texture consisting of microscopic hills and valleys which serve as storage places for water in background areas. Preferably these particles are oxides or hydroxydes of beryllium, magnesium, aluminium, silicon, gadolinium, germanium, arsenic, indium, tin, antimony, tellurium, lead, bismuth, titanium or a transition metal. Particularly preferable inorganic particles are oxides or hydroxides of aluminum, silicon, zirconium or titanium, used in at most 75% by weight of the hydrophilic layer. The inorganic pigments may have have a particla size ranging from 0.005 $\mu$m to 10 $\mu$m.

The thickness of a cross-linked hydrophilic layer in a lithographic base in accordance with this embodiment may vary in the range of 0.2 to 25 $\mu$m and is preferably 1 to 10 $\mu$m.

Particular examples of suitable cross-linked hydrophilic layers for use in accordance with the present invention are disclosed in EP-A 601240, GB-P 1419512, FR-P 2300354, U.S. Pat. No. 3,971,660, U.S. Pat. No. 4,284,705 and EP-A 514490.

As flexible support of a lithographic base in connection with the present embodiment it is particularly preferred to use a plastic film, e.g. subbed polyethylene terephthalate film, subbed polyethylene naphthalate film, cellulose acetate film, polystyrene film, polycarbonate film etc. The plastic film support may be opaque or transparent.

III. The Ink Jet Printing Process

In ink jet printing tiny drops of ink fluid are projected directly onto an ink receptor surface without physical contact between the printing device and the receptor. The printing device stores the printing data electronically and controls a mechanism for ejecting the drops image-wise. Printing is accomplished by moving the print head across the paper or vice versa. Early patents on ink jet printers include U.S. Pat. Nos. 3,739,393, 3,805,273 and 3,891,121.

The jetting of the ink droplets can be performed in several different ways. In a first type of process a continuous droplet stream is created by applying a pressure wave pattern. This process is known as continuous ink jet printing. In a first embodiment the droplet stream is divided into droplets that are electrostatically charged, deflected and recollected, and into droplets that remain uncharged, continue their way undeflected, and form the image. Alternatively, the charged deflected stream forms the image and the uncharged undeflected jet is recollected. In this variant of continuous ink jet printing several jets are deflected to a different degree and thus record the image (multideflection system).

According to a second process the ink droplets can be created "on demand" ("DOD" or "drop on demand" method) whereby the printing device ejects the droplets only when they are used in imaging on a receiver thereby avoiding the complexity of drop charging, deflection hardware, and ink recollection. In drop-on-demand the ink droplet can be formed by means of a pressure wave created by a mechanical motion of a piezoelectric transducer (so-called "piezo method"), or by means of discrete thermal pushes (so-called "bubble jet" method, or "thermal jet" method).

The present invention will now be illustrated by the following examples without however being limited thereto.

EXAMPLES

The oleophilizing capacity of representatives of the different chemical substances described above was tested using the following procedure. The oleophilizing agent was dissolved in isopropanol in a concentration of 0.1 to 2% w/w. Next a 6 μl droplet of the ink fluid was jetted on a lithographic electrochemically grained and anodised aluminum receiver as described above. The local oleophilicity was tested by mounting the plate on an ABDICK 360 press and using VAN SON RUBBERBASE as ink (registered trade mark of van Son Co.) and 2% TAME (trade mark of Anchor/Lithchemko Co.) as fountain. The ink uptake of the droplet image was evaluated.

The results are summarized in table II

TABLE II

| Example No. | Compound | Conc. % w/w | Ink uptake |
|---|---|---|---|
| 1. | I-4 | 0.1 | Excellent |
| 2. | " | 0.5 | " |
| 3. | " | 1.0 | " |
| 4. | " | 2.0 | " |
| 5. | I-3 | 0.1 | " |
| 6. | " | 0.5 | " |
| 7. | " | 1.0 | " |

TABLE II-continued

| Example No. | Compound | Conc. % w/w | Ink uptake |
|---|---|---|---|
| 8. | " | 2.0 | " |
| 9. | None | — | No uptake |

The results of table II clearly demonstrate the excellent oleophilizing properties of the compounds used in accordance with the present invention. Having described in detail preferred embodiments of the current invention, it will now be apparent to those skilled in the art that numerous modifications can be made therein without departing from the scope of the invention as defined in the appending claims.

What is claimed is:

1. A method for the preparation of a lithographic printing plate, said method comprising dispensing information-wise by means of ink jet printing droplets of a fluid onto a surface of a lithographic receiver, characterized in that said fluid contains an oleophilizing compound having in its chemical formula a 1,3-dicarbonyl group capable of reacting with said surface of said lithographic receiver.

2. A method according to claim 1 wherein said compound is selected from the group consisting of β-diketones, β-dialdehydes, 1,3-aldehydo-ketones, β-keto-esters, β-ketothioesters, β-aldehydo-esters, β-aldehydo-thioesters, β-ketoamides, β-aldehydo-amides, 1,3-diesters, 1,3-dithioesters, and 1,3-diamides.

3. A method according to claim 1 wherein said oleophilizing compound is present in said fluid in an amount ranging from 0.01 to 6 by weight.

4. A method according to claim 1 wherein said fluid further contains a colorant.

5. A method according to claims 1 wherein said surface of said lithographic receiver is metallic.

6. A method according to claim 5 wherein said metallic surface is a grained and anodised aluminum.

7. A method according to claim 1 wherein said lithographic receiver comprises a support and a cross-linked hydrophilic layer.

8. A method according to claim 7 wherein said hydrophilic layer comprises an inorganic pigment.

9. A method according to claim 8 wherein said organic pigment is chosen from an oxide or hydroxide of beryllium, magnesium, aluminum, silicon, gadolinium, arsenic, indium, tin, antimony, tellurium, lead, bismuth, titanium or a transition metal.

* * * * *